(12) United States Patent
Keller et al.

(10) Patent No.: US 10,268,945 B1
(45) Date of Patent: Apr. 23, 2019

(54) RFID TAGS

(71) Applicant: Amazon Technologies, Inc., Seattle, WA (US)

(72) Inventors: Kevin E. Keller, Sunnyvale, CA (US); Ronald Eugene Huebner, Seattle, WA (US); Somasundaram Niranjaya, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 14/788,302

(22) Filed: Jun. 30, 2015

(51) Int. Cl.
*G06K 19/077* (2006.01)
*G06K 19/07* (2006.01)

(52) U.S. Cl.
CPC ... *G06K 19/07771* (2013.01); *G06K 19/0708* (2013.01); *G06K 19/07722* (2013.01)

(58) Field of Classification Search
CPC .............. G08B 13/242; G08B 13/2437; G08B 13/2442; G06K 19/07345; G06K 19/07749
See application file for complete search history.

(56) References Cited

U.S. PATENT DOCUMENTS

| | | | |
|---|---|---|---|
| 5,241,299 A * | 8/1993 | Appalucci | G06K 19/0672 340/572.3 |
| 5,442,334 A * | 8/1995 | Gallo | G08B 13/242 156/272.2 |
| 6,130,648 A | 10/2000 | Rulf et al. | |
| 7,535,366 B2 | 5/2009 | Egbert et al. | |
| 9,235,928 B2 | 1/2016 | Medioni et al. | |
| 9,473,747 B2 | 10/2016 | Kobres et al. | |
| 2004/0140934 A1 | 7/2004 | Korva | |
| 2006/0054710 A1 | 3/2006 | Forster et al. | |
| 2008/0068175 A1 | 3/2008 | Hockey et al. | |
| 2009/0109035 A1 | 4/2009 | Subramanian et al. | |
| 2009/0128446 A1 | 5/2009 | Gummalla et al. | |
| 2009/0243781 A1 | 10/2009 | Nomura et al. | |
| 2010/0134291 A1 | 6/2010 | Lavedas | |
| 2010/0141452 A1 * | 6/2010 | Lian | G06K 19/07345 340/572.3 |
| 2011/0139880 A1 | 6/2011 | Yamazaki et al. | |
| 2012/0092220 A1 | 4/2012 | Tani et al. | |
| 2012/0149257 A1 | 6/2012 | Malervy | |

(Continued)

FOREIGN PATENT DOCUMENTS

WO WO2008076561 A2 6/2008

OTHER PUBLICATIONS

Brocato, "Passive Microwave Tags", Sandia National Laboratories, Oct. 2004, 30 pages.

(Continued)

*Primary Examiner* — Nabil H Syed
(74) *Attorney, Agent, or Firm* — Lee & Hayes, P.C.

(57) ABSTRACT

This disclosure describes RFID tags configured to fracture when heated, such as when exposed to threshold levels of electromagnetic energy. In some instances, the RFID tags include materials that expand when heated for the purpose of stressing metal antenna traces of the RFID tags. When under stress from these expansion materials that bond to the antennas (e.g., thermoplastics), these antennas may fracture, thus lessening the risk that the dangerous arcing will occur from the electromagnetic energy, such as when an item and corresponding tag are placed in a microwave oven.

10 Claims, 8 Drawing Sheets

(56) References Cited

U.S. PATENT DOCUMENTS

| | | |
|---|---|---|
| 2013/0284806 A1 | 10/2013 | Margalit |
| 2014/0014732 A1 | 1/2014 | Finn et al. |
| 2014/0144992 A1 | 5/2014 | Diorio et al. |
| 2014/0145906 A1 | 5/2014 | Kato et al. |
| 2014/0375524 A1 | 12/2014 | Nago |
| 2015/0136856 A1 | 5/2015 | Herslow et al. |
| 2016/0148027 A1* | 5/2016 | Schoutens ........ G06K 19/07749 340/10.1 |
| 2016/0172760 A1 | 6/2016 | Brown et al. |

OTHER PUBLICATIONS

Office action for U.S. Appl. No. 15/086,355, dated Oct. 13, 2016, Hahn et al., "RFID Tags", 8 pages.
Office action for U.S. Appl. No. 15/086,855, dated Jun. 29, 2017, Hahn et al., "RFID Tags", 5 pages.
Office action for U.S. Appl. No. 15/086,855, dated Feb. 1, 2018, Hahn, "RFID Tags", 5 pages.
Office Action for U.S. Appl. No. 15/086,855, dated Oct. 18, 2018, Hahn et al, "RFID Tags", 5 pages.

\* cited by examiner

RFID TAGS

BACKGROUND

Radio frequency identification (RFID) represents the wireless use of electromagnetic fields to transfer data for the purpose of identifying and tracking RFID tags, which may be attached to objects being monitored and/or tracked. In some instances, RFID tags comprise passive tags that receive power via electromagnetic induction from magnetic fields produced by an RFID reader. In other instances, RFID tags comprise active tags that include their own power source. In either instance, RFID tags typically include a metal antenna or trace. As such, undesirable electric arcing may occur in an RFID tag when a certain amount of electromagnetic energy is applied to the tag.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
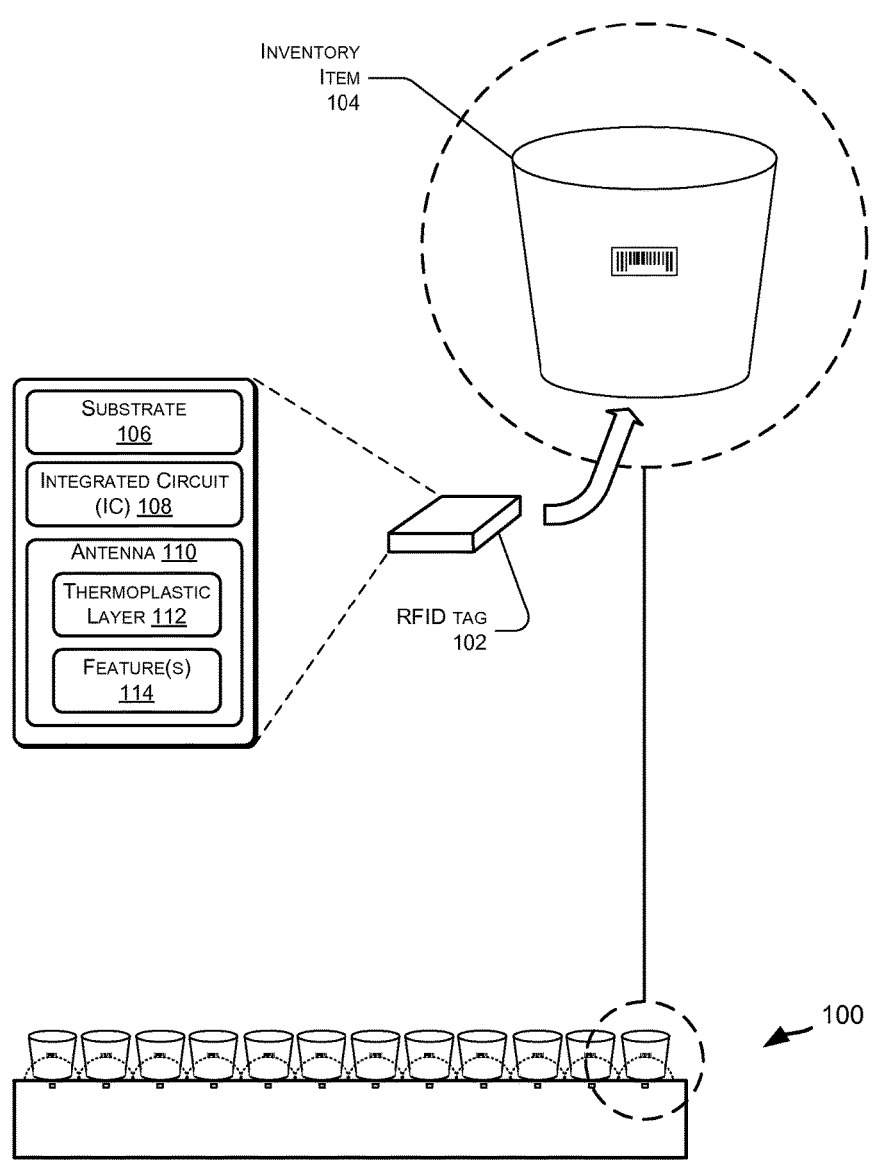
FIG. 1 shows an example RFID tag that is coupled to a microwaveable food item and that is configured to fracture upon absorption of a threshold level of electromagnetic energy. Therefore, a user may be able to heat the food item in a microwave without fear of arcing, since the RFID tag coupled to the item may fracture and prevent such arcing.

This disclosure describes RFID tags configured to fracture when heated, such as when exposed to threshold levels of electromagnetic energy. In some instances, the RFID tags include materials that expand when heated for the purpose of stressing metal antenna traces of the RFID tags. When under stress from these expansion materials that bond and are adjacent to the antennas (e.g., thermoplastics), these antennas may fracture, thus lessening the risk that the dangerous arcing will occur from the electromagnetic energy. For instance, if such an RFID tag were place and heated in a microwave, the antenna of the RFID tag may fracture such that the chances that the antenna will arc decrease. In addition or in the alternative to the expansive material, RFID tags described herein may include one or more features that assist in the fracture of the tags. For instance, antennas of the RFID tags may include one or more notches or serrations that have been intentionally formed. Additionally or alternatively, the antennas may have varying thicknesses such that the thinner portions of the antenna are likely to fracture more easily that other portions of the antennas. In still other instances, the antennas may comprise multiple fragments that are adjacent and relatively close to one another—in order to function effectively as an antenna—but that are noncontiguous from one another such that arcing is reduced.

In still other instances, the RFID tags described herein may be formed at least in part from susceptive materials. For instance, an antenna for an RFID tag may be etched from a susceptor, applied to a substrate, and coupled to an integrated circuit (IC). Susceptors, or "susceptive materials", may comprise a metalized film, ceramics, and/or metals. For instance, an RFID tag formed in part of a susceptor may comprise a layer of metal and a layer of dielectric material, such as a thermoplastic polymer. For instance, the susceptive material may comprise a layer of aluminum deposited onto a layer of polyethylene-terephthalate (PET) or a polyimide. When the RFID tag—and hence, the susceptive material—is subject to the electromagnetic radiation in the microwave, the dielectric layer may covert the radiation into heat and expand, causing the metal layer to crack. These cracks within the metal layer may lessen or prevent dangerous arcing by the metal. As such, the inventory item comprising the RFID tag may be safely placed in the microwave and subject to electromagnetic energy.

Further, in some instances the antenna of an RFID tag may comprise a metal layer encapsulated (e.g., fully encapsulated) by a layer of dielectric material, such as a polyimide. For instance, the metal layer of the antenna may be fully encapsulated on all sides by Kapton tape or another type of dielectric material. As with the RFID tags discussed immediately above, the resulting RFID tag may avoid arcing and, hence, may be safely placed in a microwave and subjected to electromagnetic radiation.

As described below, RFID tags may couple to inventory items for tracking these items. In some implementations, the RFID tag may include an adhesive on a portion of the exterior of an RFID tag surface to enable attachment of the tag to an inventory item. In other instances, the RFID tag may be integral with a container of the inventory item.

In some instances, multiple inventory items may reside in a common area, such as on a shelf of a store such that customers may obtain (i.e., "pick") these items from the shelf. An RFID reader may periodically or continuously send signals to and receive signals from the RFID tags coupled to the items for monitoring a population of the items. For instance, envision that ten inventory items that each include or are coupled to an RFID tag initially reside upon a shelf. When the RFID reader sends a signal to the RFID tags, all ten may receive the signal and may send a response back to the reader. Upon receiving a response from all ten RFID tags, the RFID reader may confirm that the population of items on the shelf remains at ten inventory items. However, after a user picks one of these items and the RFID reader sends a signal the population of tags, only nine RFID tags may receive the signal and send a response, given that the inventory item coupled to the tenth RFID tag has been picked and is out of range of the RFID reader. In response to receiving the nine responses, the RFID reader or another component of the system may determine that only nine items remain in the population of items on the shelf.

While the inventory items may comprise any sort of physical item capable of being picked, in certain instances the inventory items may comprise items designed to be exposed to electromagnetic energy. For instance, the inventory items may comprise a food item having a container configured to be microwavable by a user. A "food item" may include solids and/or liquids, such as pastas, soups, beverages, or the like.

When a user picks a microwavable food item and returns home with the item, the user may eventually place the item in the microwave. Furthermore, in instances where the item couples to the RFID tag (e.g., the RFID tag attaches onto a packaging of the item or the RFID tag is integral with the packaging), the RFID tag may also be placed in the microwave and, hence, exposed to electromagnetic energy. However, because RFID tags typically contain metal, the metal portion of the RFID tag may arc and, hence, be unsafe in this environment.

To address at least this problem, the RFID tags introduced above and described further below may be formed, at least in part, from materials that expand and crack when absorbing electromagnetic energy that is above a certain threshold, such as the amount of electromagnetic energy experienced when heated in a microwave oven. These tags may affix to containers of microwavable food items or may be integrated with the containers of the microwavable food items. The expanding and cracking of the materials of the RFID tags functions to decrease or prevent arcing when the inventory items and the corresponding RFID tags are subject to electromagnetic energy, such as when an item and corresponding tag are placed in a microwave oven.

FIG. 1 shows an example RFID tag 102 that is coupled to a microwaveable food item 104 and that is configured to fracture when heated, such as when exposed to threshold levels of electromagnetic energy. Because of this, arcing may avoided if a user were to heat the food item 104 in a microwave with the RFID tag 102 still coupled to the item.

An RFID tag, such as the tag 102, generally refers to a device with an antenna or resonator that can produce a wireless signal when activated or powered. The wireless signal produced by the RFID tag 102 is typically low power, and intended for transmission over short distances. The RFID tag 102 may be formed of any material and may be flexible or rigid. For example, the RFID tag 102 may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (e.g., a battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

Initially, FIG. 1 illustrates multiple microwavable food items located on an example inventory shelf 100. As illustrated, each inventory item 104 may couple to a respective RFID tag 102. The RFID tag 102 may physically attach to the item 104 after manufacture of the container of the item 104, or the tag 102 may be integral with the container itself. In either case, the RFID tag 104 may include, in some instances, a substrate 106, an integrated circuit (IC) 108, and an antenna 110. The antenna 110 may be formed in whole or in part from a susceptor and/or may include a thermoplastic layer 112 that expands when heated and/or one or more features 114 that assist in fracturing the antenna when heated. The antenna 110 may comprise a receiver to receive a signal from an RF reader and a transmitter to transmit a response to the signal to the RF reader. In some instances, the receiver and the transmitter may be integrated, forming a transceiver.

The IC 108 may bond to the substrate 106 and may be configured to receive power from the interrogating signal to power the RFID tag 102, demodulate the interrogating signal from an RFID reader, and modulate a response for transmission to the RFID reader. The antenna 110, meanwhile, may also bond to the substrate and may be configured to receive an interrogating signal from the RFID reader and transmit a response to the interrogating signal to the RFID reader. As described above, the response may identify at least one of the RFID tag or the inventory item, thus allowing the RFID reader to determine that the tag and/or the item are still located on the inventory shelf 100. Also as discussed above, the antenna 110 may be formed of materials that are configured to expand and crack when absorbing electromagnetic energy, thus preventing arcing when absorbing the electromagnetic energy.

When the antenna is etched from a susceptor, the susceptive material may comprise a layer of metal and a layer of dielectric material, such as a thermoplastic polymer. For instance, the susceptive material may comprise a layer of aluminum deposited onto a layer of polyethylene-terephthalate (PET) or a polyimide. When the RFID tag—and hence, the susceptive material—is subject to the electromagnetic radiation in the microwave, the dielectric layer may covert the radiation into heat and expand, causing the metal layer to crack. These cracks within the metal layer may lessen or prevent dangerous arcing by the metal. As such, the inventory item comprising the RFID tag may be safely placed in the microwave and subject to electromagnetic energy.

While the above example describes that the tag 102 may be etched directly from a susceptor, in other instances the tag 102 may be made using the thermoplastic layer 112, which may comprise the same materials described above (e.g., PET). In some instances, the thermoplastic layer may cover substantially all of the metal trace of the antenna 110. For instance, the metal trace of the antenna may effectively be "sandwiched" between two layers of thermoplastic. These layers may have substantially the same footprint as the metal trace, or may have a larger footprint (e.g., to match the footprint of the substrate 106).

In other instances, meanwhile, the thermoplastic layer 112 may couple to some but not all of the metal trace portion of the antenna 110. For instance, the thermoplastic layer 112 may be placed in strategic locations to induce stress in those locations when the thermoplastic is heated and, therefore, expands. In some instances, a designer of the RFID tag 102 may conduct electromagnetic simulations on the metal trace of a particular RFID tag to identify locations that are especially susceptible to sparking when the electromagnetic energy is applied. After identifying these locations, the design of the tag 102 may specify that the thermoplastic layer 110 should be placed at these locations to induce cracking and, correspondingly, reduce sparking.

In addition or in the alternative to the thermoplastic layer, the RFID tag 102 may include one or more features 114 that induce fracture of the tag 102 when heated. These features 114 may be applied to the metal trace of the antenna, as illustrated and discussed below with reference to FIGS. 5-8. For instance, these features may be embossed, stamped, or pressed into the antenna or applied in any other suitable fashion. For instance, one or more notches may be made in the metal trace of the antenna 110 to create a weak spot where the trace will likely crack when stress is applied to the trace (e.g., through expansion of the thermoplastic layer 110). In some instances, these notches may be made substantially perpendicular (or orthogonal) to the length of the antenna trace.

In other instances, the features 114 may include one or more serrations along an edge of the metal trace. Again, these serrations may introduce a weak point at which the tag may be configured to crack when heated or otherwise placed under stress. Additionally, the features 114 may comprise a varying thickness of the metal trace. That is, the metal trace may vary substantially in thickness such that the substantially thinner sections may be configured to fracture much more readily as compared to the substantially thicker sections. In some instances. The thin sections may be twice as thin as the remaining sections, four times as thin as the remaining sections, or the like. While a few example features 114 have been described it is to be appreciated that others are possible. Further, antennas may include any one or more combination of these features 114.

In some instances, the RFID tags described herein may include antenna traces comprising (in some cases, consisting of) multiple trace fragments. That is, a traditional antenna trace may be fragmented into multiple fragments while still arranged in the predefined manner of the trace. As such, each of the fragments may be adjacent to another fragment, while not touching (i.e., being noncontiguous with) the adjacent fragment. By breaking the trace into fragments before or after bonding these fragments to the substrate 106 in close proximity to one another, the antenna of the resulting RFID tag may still function to receive and send signals, while reducing sparking and, hence, reducing electric arcing when the tag absorbs electromagnetic energy. In some instances, the trace may be broken into the fragments at the locations having previously been deemed (using the electromagnetic simulations) as especially susceptible to sparking.

Figure 2:
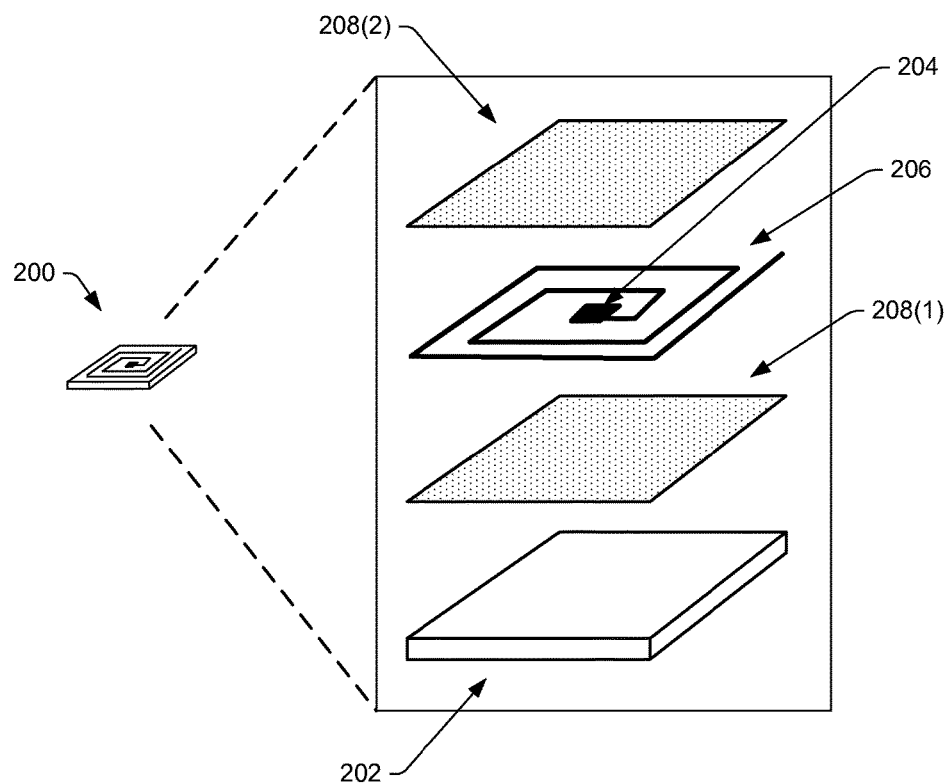
FIG. 2 shows an expanded view of an example RFID tag that is configured to fracture upon absorption of a threshold level of electromagnetic energy. Here, the RFID tag includes a layer of thermoplastic above and below an antenna of the tag, with these thermoplastic layers configured to expand when heated, thus causing the antenna to fracture. After the antenna fractures, chances of substantial electric arcing occurring substantially lessens.

FIG. 2 shows an expanded view of an example RFID tag 200 that is configured to fracture upon absorption of a threshold level of electromagnetic energy. Here, the RFID tag 200 includes a substrate 202, an IC 204, an antenna (or antenna trace) 206, and two layers of thermoplastic 208(1) and 208(2). The first thermoplastic layer 208(1) is adjacent to a bottom side of the trace 206 disposed towards the substrate 202, while the second thermoplastic layer 208(2) is adjacent a top side of the trace 206 disposed away from the substrate 202. As illustrated, the thermoplastic layers may have a footprint that is bigger than the footprint of the trace 206. In fact, in this example the thermoplastic layers 208 have a footprint that substantially matches the footprint of the substrate 202. Furthermore, in this example the thermoplastic layers 208 bond to and substantially encapsulate the antenna 206. When these thermoplastic layers expand due to heat (e.g., when placed in a microwave oven), these layers 208 may expand. Because these layers 208 adhere to the antenna 206, expansion of the thermoplastic stresses the antenna 206, potentially causing the antenna to fracture. After the antenna fractures, the chances of substantial electric arcing occurring substantially lessens.

Figure 3:
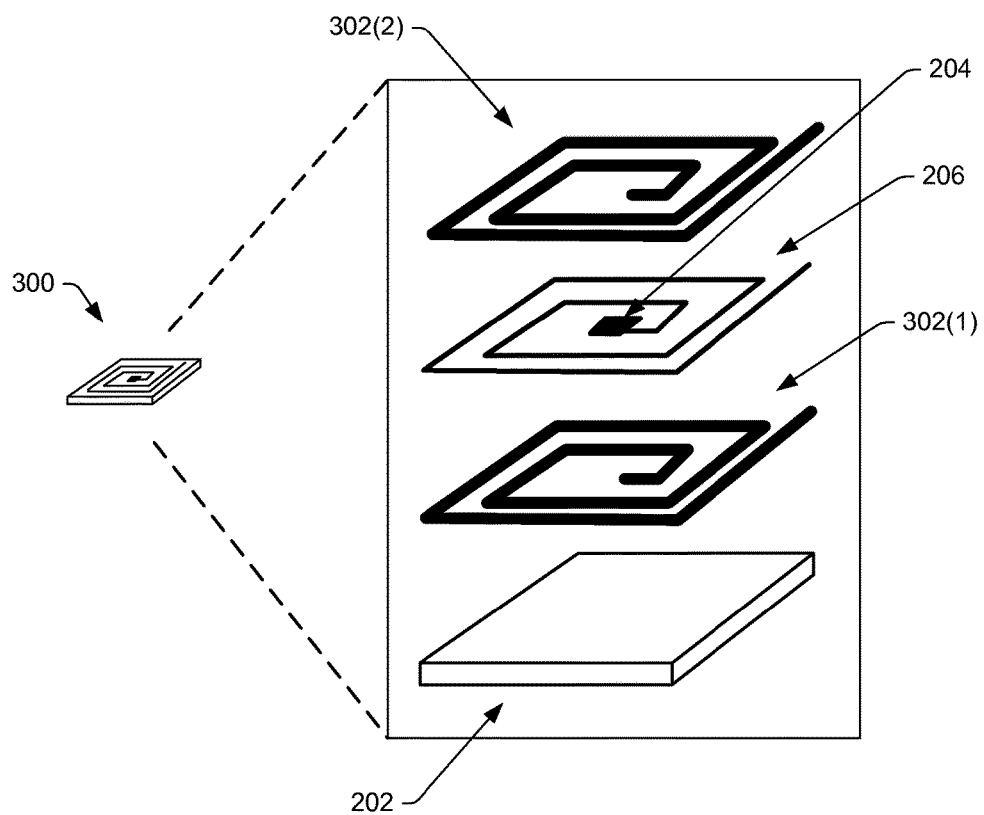
FIG. 3 shows an exploded view of another example RFID tag that is configured to fracture upon absorption of a threshold level of electromagnetic energy. Here, the thermoplastic layers above and below the antenna have a footprint that substantially corresponds to the antenna.

FIG. 3 shows an exploded view of another example RFID tag 300 that is also configured to fracture upon absorption of a threshold level of electromagnetic energy. Here, the tag 300 includes thermoplastic layers 302(1) and 302(2) that are above and below the antenna, and that have a footprint that substantially corresponds to the antenna. That is, the thermoplastic layers may be etched from a thermoplastic substrate in a manner that substantially matches the footprint of the antenna trace 206 of the tag 300. When these thermoplastic layers are heated, these layers 302 may expand due to heat absorption. Because these layers 302 adhere to the antenna 206, expansion of the thermoplastic stresses the antenna 206, potentially causing the antenna to fracture. After the antenna fractures, the chances of substantial electric arcing occurring lessens.

Figure 4:
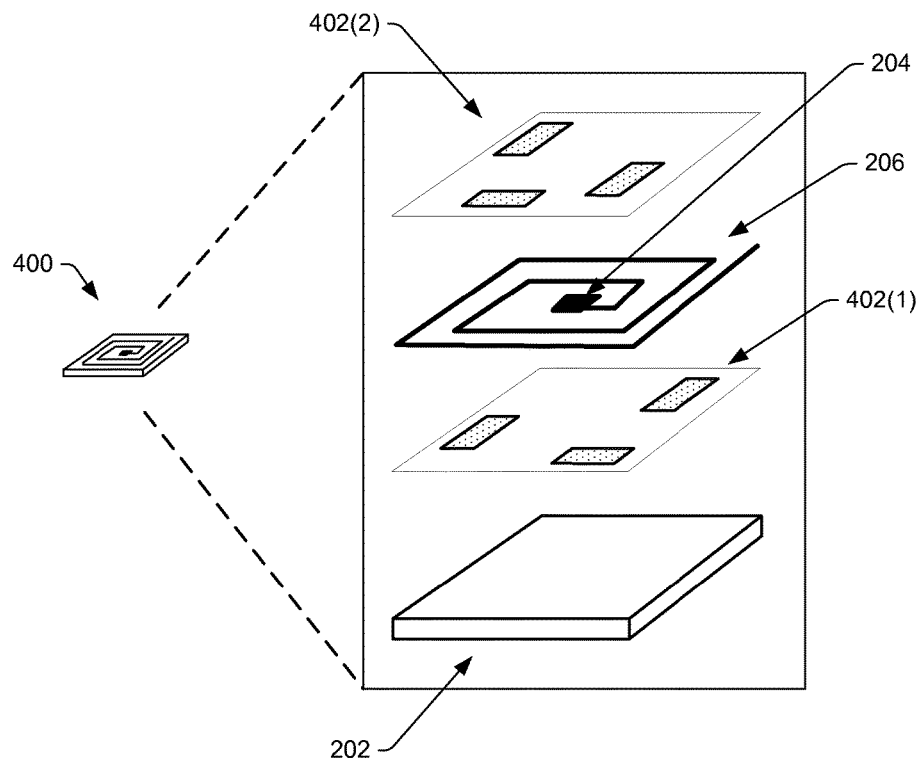
FIG. 4 shows an exploded view of yet another example RFID tag that is configured to fracture upon absorption of a threshold level of electromagnetic energy. Here, the thermoplastic is applied to some but less than all of the surface area of the antenna.

FIG. 4 shows an exploded view of yet another example RFID tag 400 that is configured to fracture upon absorption of a threshold level of electromagnetic energy. In this example, the thermoplastic is applied to some but less than all of the surface area of the antenna. Specifically, the tag 400 includes a first thermoplastic layer 402(1) that includes one or more sections of thermoplastic that are adjacent to respective portions of a bottom side of the antenna trace 206. The tag 400 may also include a second layer 402(2) that is adjacent to one or other portions of a top side of the trace 206. In some instances, the layout of these thermoplastic portions may correspond to locations in the antenna trace having been previously determined to be especially susceptible to sparking.

While portions of the antenna trace 206 may bond to one or both of the thermoplastic layers 402, other portions of the trace 206 may bond directly to the substrate 202. For example, these portions may be bonded to the substrate 202 with an epoxy having a coefficient of thermal expansion that is sufficiently different from the thermoplastic layers. When the tag is heated, these differing coefficients of thermal expansion may result in increased stress on the antenna 206, thus assisting in the fracture of the antenna 206.

Figure 5:
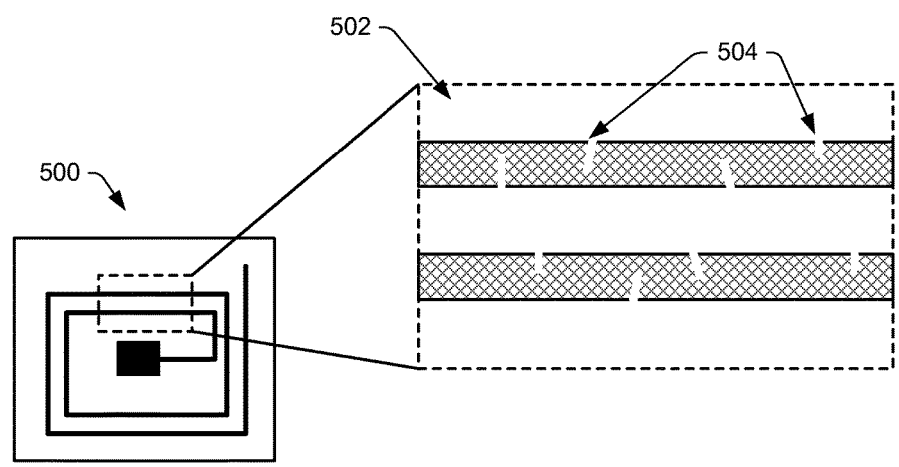
FIG. 5 illustrates a magnified view of an antenna of an RFID tag. Here, the antenna includes one or more notches that have been intentionally made in the tag to decrease the chances of dangerous electric arcing and to weaken the tag and assist in fracture of the tag when the electromagnetic energy is applied to the tag.

FIG. 5 illustrates a magnified view of an antenna 502 of an RFID tag 500. Here, the antenna includes one or more notches 504 that have been intentionally made in the trace 502 of the tag 500 to weaken the tag and assist in fracture of the tag when the electromagnetic energy is applied to the tag. That is, the notches 504 may create points in the trace 502 that are most likely to fracture when stress is applied to the trace 502. As such, when stress is imposed on the trace 502 due to the expanding of a thermoplastic layer of the tag 500, the trace 502 may fracture. As described above, this may decrease the chance of dangerous arcing occurring when electromagnetic energy is applied to the tag 500.

Figure 6:
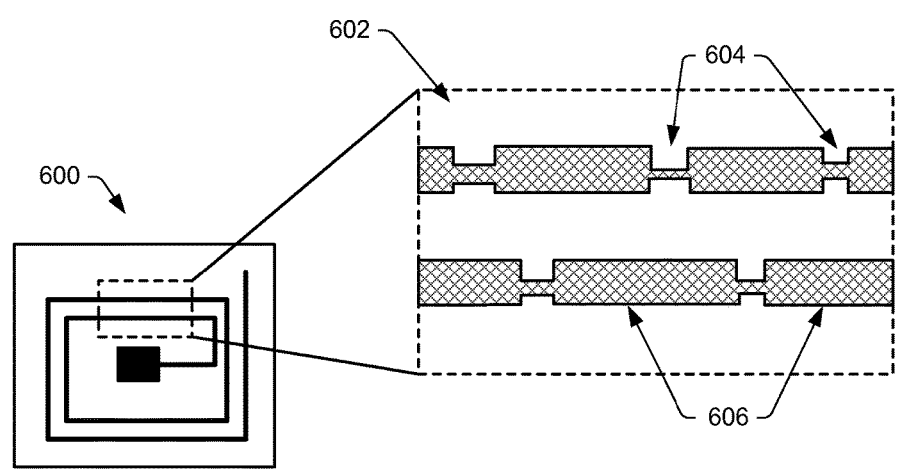
FIG. 6 illustrates a magnified view of another antenna of an RFID tag. Here, the antenna includes a varying thickness to decrease the chances of dangerous electric arcing and to weaken the tag and assist in fracture of the tag when the electromagnetic energy is applied to the tag.

FIG. 6 illustrates a magnified view of another antenna 602 of an RFID tag 600. Here, the antenna 602 includes a varying thickness to weaken the tag 600 and assist in fracture of the tag when the electromagnetic energy is applied to the tag. That is, the thinner portions of the trace 602 may create points in the trace 602 that are most likely to fracture when stress is applied. As such, when stress is imposed on the trace 602 due to the expanding of a thermoplastic layer of the tag 600, the trace 602 may fracture. As described above, this may decrease the chance of dangerous arcing occurring when electromagnetic energy is applied to the tag 600. In some instances, the thinner portions of the trace may be twice as thin, four times as thin, or thinner than the remaining portions of the trace 602 by any other amount.

Figure 7:
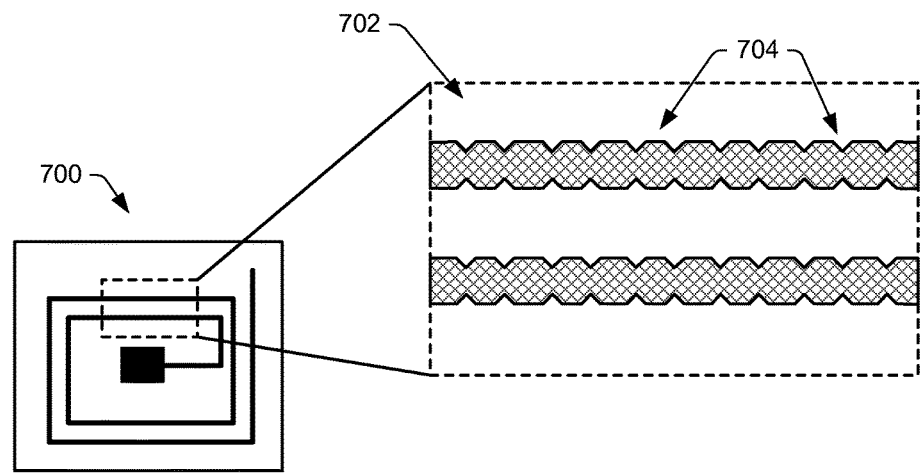
FIG. 7 illustrates a magnified view of another antenna of an RFID tag. Here, the antenna includes multiple serrations along an edge of the antenna to decrease the chances of dangerous electric arcing and to weaken the tag and assist in fracture of the tag when the electromagnetic energy is applied to the tag.

FIG. 7 illustrates a magnified view of another antenna 702 of an RFID tag 700. Here, the antenna 702 includes multiple serrations 704 along an edge of the antenna 704 to weaken the tag 700 and assist in fracture of the tag when the electromagnetic energy is applied to the tag. As illustrated, the serrations may represent a set of indentations or tooth like projections, potentially in a saw-tooth pattern or otherwise. These serrations 704 may create points in the trace 702 that are most likely to fracture when stress is applied. As such, when stress is imposed on the trace 702 due to the expanding of a thermoplastic layer of the tag 600, the trace 702 may fracture partly due to inclusion of the serrations 704 on the trace 702. As described above, this may decrease the chance of dangerous arcing occurring when electromagnetic energy is applied to the tag 700. Further, while the notches described above may represent scores or cracks made to the body of the metal layer of an antenna, the serrations described herein may form a pattern on an edge of the metal layer.

Figure 8:
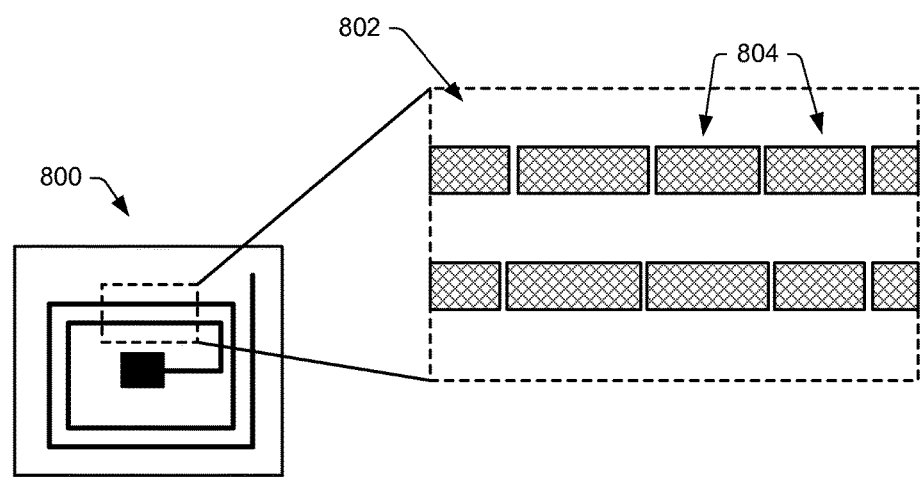
FIG. 8 illustrates a magnified view of another antenna of an RFID tag. Here, the antenna comprises multiple fragments that are adjacent to but noncontiguous from one another, thus reducing the changes that dangerous arcing will occur when the tag absorbs electromagnetic energy.

FIG. 8 illustrates a magnified view of another antenna 802 of an RFID tag 800. Here, the antenna 802 comprises multiple isolated fragments 804 that are adjacent to but noncontiguous from one another, thus reducing the changes that dangerous arcing will occur when the tag absorbs electromagnetic energy. That is, the antenna 804 may comprise an antenna trace that has been broken into fragments but arranged on a substrate of the tag 800 (or on a thermoplastic layer) in a similar manner as if the trace had not been fragmented. Because these fragments are adjacent to one another, the trace 802 may continue to perform the operations of receiving and sending signals. However, because some or all of these fragments are isolated from one another and, hence, not touching one another, the risk of sparking occur at the trace 802 when electromagnetic energy is applied to the tag 800 is lessened.

Figure 9:
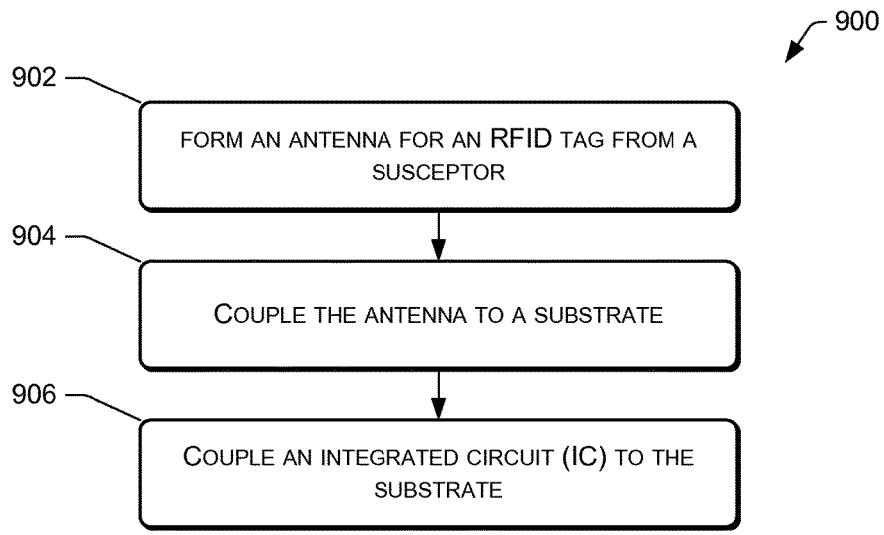
FIG. 9 shows an example flow diagram of a process for forming an RFID tag from susceptive materials.

FIG. 9 shows an example flow diagram of a process 900 for forming an RFID tag from susceptive materials. The order in which the operations of the processes described herein are described is not intended to be construed as a limitation, and any number of the described operations can be combined in any order and/or in parallel to implement the process.

At 902, the process 900 forms an antenna for an RFID tag from a susceptor. For instance, a susceptor may be obtained and an antenna may be etched out of the susceptor such that the antenna is able to absorb electromagnetic energy (e.g., within a microwave) and avoid dangerous arcing. The antenna may be configured to receive inbound signals from an RFID reader and transmit outbound signals to the reader. At 904, the process 900 couples the susceptive antenna to a substrate. At 906, the process 900 couples an IC to the substrate, such that an RFID tag is formed that is able to placed safely within an operating microwave. The IC may demodulate the inbound signals and modulate the outbound signals prior to transmission to the RFID reader by the antenna.

Figure 10:
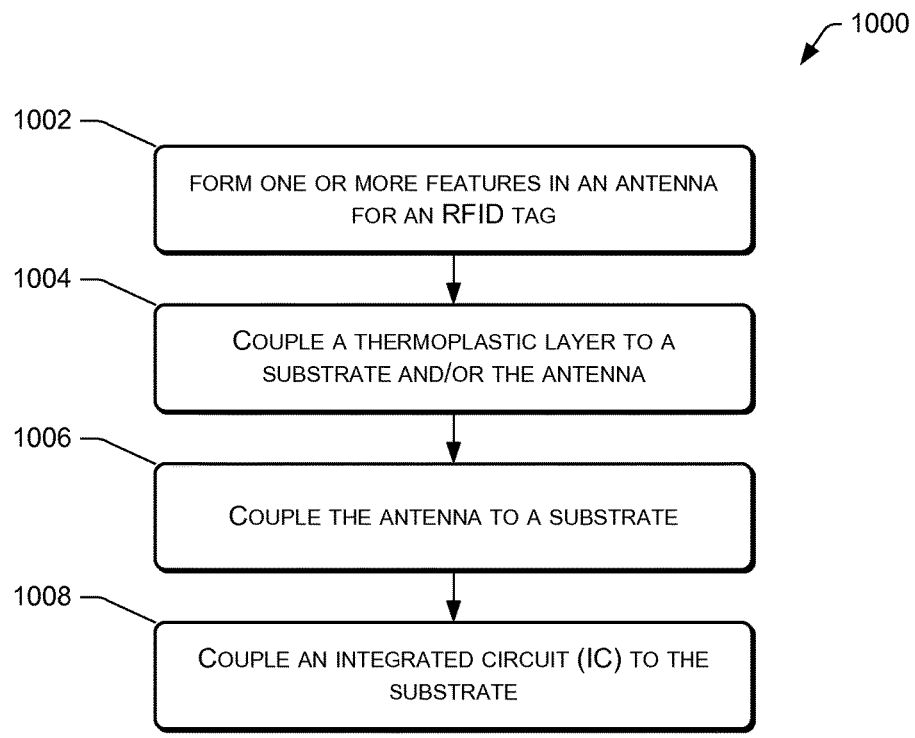
FIG. 10 shows a flow diagram of an example process for forming an RFID tag that includes an antenna having one or more features (e.g., notches, serrations, varying thickness, etc.) formed therein.

FIG. 10 shows a flow diagram of an example process 1000 for forming an RFID tag that includes an antenna having one or more features (e.g., notches, serrations, varying thickness, etc.) formed therein. At 1002, the process 1000 forms one or more features in an antenna for an RFID tag. This may include embossing, stamping, pressing, or otherwise applying notches, serrations, or other weaknesses into the antenna. Additionally or alternatively, this may include forming an antenna such that it has varying thickness, including relatively thinner portions. In still other instances, this operation may include forming an antenna from multiple fragments, or breaking an existing antenna into multiple fragments.

At 1004, the process 1000 couples a thermoplastic layer to a substrate and/or to the antenna formed at 1002. For instance, this operation may include bonding a thermoplastic layer to some or all of a bottom side of an antenna trace, and/or bonding a thermoplastic layer to some or all of a tope side of the antenna trace. At 1006, the process 1000 couples the antenna to a substrate. At 1008, the process 1008 couples an integrated circuit to the substrate.

Figure 11A:
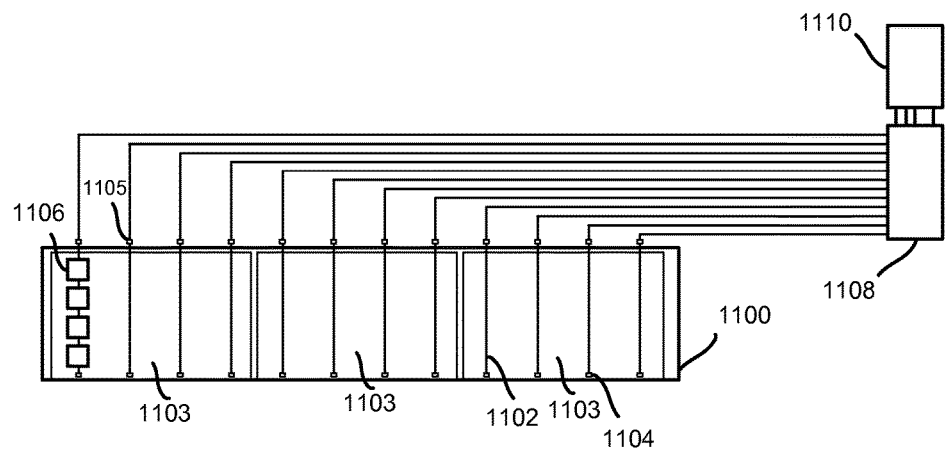
FIGS. 11A-C collectively show an example RFID system configuration in which antennas of an RFID reader are embedded within a shelf on which inventory items may rest. The inventory items may couple to respective RFID tags that interact with the RFID reader.

FIG. 11A is a top-down illustration of an antenna embedded inventory shelf 1100, representing one environment that may include the RFID tags described herein. The antenna-embedded inventory shelf 1100 includes a plurality of antenna elements 1102 of an RFID reader, with the antenna elements 1102 positioned along the antenna-embedded inventory shelf 1100. For example, two or more of the antenna elements 1102 may be substantially parallel to each other and extend from the rear or back of the substrate toward the front of the substrate. In this example, there are twelve antenna elements 1102. In other implementations, there may be fewer or additional antenna elements 1102 included in the antenna embedded inventory shelf 1100.

The spacing or separation between the antenna elements may be uniform across the antenna embedded inventory shelf 1100 and/or may vary based on the size, type and/or number of inventory items 1106 that may be placed on the antenna embedded inventory shelf 1100. For example, the antenna elements may be spaced between approximately two inches and approximately six inches to accommodate different sizes of inventory items 1106. In other implementations, the antenna elements may be included in a prefabricated sheet or set of antenna elements, such as antenna element sheets 1103, each of which include four equally spaced antenna elements. The antenna element sheets may be placed adjacent to one another along the antenna embedded inventory shelf 1100. To vary antenna element spacing along the antenna embedded inventory shelf 1100, antenna element sheets having antenna elements with different spacings may be placed on the antenna embedded inventory shelf 1100.

In one implementation, the antenna elements 1102 are positioned on the antenna embedded inventory shelf 1100 so that items placed on the antenna embedded inventory shelf 1100 are positioned above each antenna element. For example, each row of inventory items 1106 may be positioned over an antenna element 1102. By positioning the inventory items over the antenna elements 1102, RFID tags attached to or included in the inventory items may be energized by an antenna element 1102. In some implementations, when an antenna element and/or RFID reader receives an RFID tag identifier from an RFID tag, it may associate the RFID tag identifier with the receiving antenna element. For example, each antenna element may include a unique position on the antenna embedded inventory shelf 1100 and/or have a corresponding unique identifier. When the RFID tag identifier is received and added to an inventory table, the corresponding antenna location and/or antenna unique identifier may be associated with the RFID tag identifier and stored in the inventory table. Associating the RFID tag identifier and the antenna location and/or antenna unique identifier provides both location information for the inventory item associated with the RFID tag identifier and identifies the antenna element 1102 that is to be excited to poll the RFID tag.

The antenna elements may be any type of antenna element capable of generating a field that can be used to energize an RFID tag so that communication with the RFID tag is enabled. For example, each antenna element may be a planar radiating transmission line. In other implementations, the antenna element may be another form of antenna, such as an omnidirectional antenna. In some implementations, the antenna elements may be configured to operate in both near field mode and far field mode. In near field, or magnetic mode, the magnetic fields generated by the antenna elements may be used to excite RFID tags within the field and read RFID tag identifiers stored on those RFID tags. For example, near field RFID tags may be placed in close proximity to the antenna elements by affixing them to the base of items. The near field RFID tags rely on magnetic coupling between the field of the antenna element and an RFID tag antenna to close the communication link so that the RFID tag identifier of the RFID tag can be read. Near field or magnetic mode is beneficial when dealing with items that are liquid filled, have a high dielectric constant or are a combination of both. Near field mode is also advantageous when a well-defined, constrained read zone is desired. This is due to the magnetic field strength falling off quickly with distance from the antenna element. In far field, or electric mode, far field tags within the field of the antenna element may also be excited and read.

Each antenna element may be terminated by a load resistor 1104 in the characteristic impedance of the antenna element to reduce standing waves and improve the uniformity of field coverage of the field generated by the antenna element 1102. The opposing end of each antenna element may, likewise, be coupled to a multiplexer 1108. The multiplexer is coupled to and controlled by an RFID reader 1110 that is configured to energize the antenna elements 1102 and may be utilized with the implementations discussed herein. For example, the RFID reader 1110 may control the multiplexer 1108 to select one or more antenna elements 1102 to energize to perform a targeted read mode. In another example, the RFID reader 1110 may control the multiplexer 1108 to select and energize all of the antenna elements 1102 to perform an inventory read mode, as discussed below.

The RFID reader may receive instructions from an inventory management system to perform the operations discussed herein. For example, the inventory management system may receive instructions to scan for RFID tag identifiers. In response, the RFID tag identifier will scan for RFID tag identifiers using an antenna element and provide the received RFID tag identifiers to the inventory management system.

While the example configuration illustrated in FIG. 11A identifies the multiplexer 1108 as separate from the RFID reader 1110, in other implementations, the multiplexer may be incorporated into the RFID reader 1110.

In some implementations, each antenna element 1102 may also include a matching circuit 1105. The matching circuit may be used to determine the return power of the antenna element and/or to dynamically tune the antenna element. In some implementations, the matching circuit 1105 may include adjustable capacitors and fixed inductors that can be adjusted to dynamically modify the impedance of the antenna element 1102.

Figure 11B:
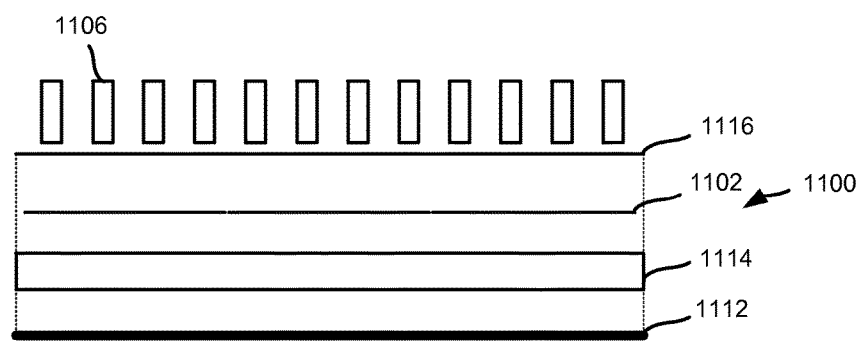

FIG. 11B is cross sectional view of the antenna embedded inventory shelf 1100, which each component of the antenna embedded inventory shelf separated for purposes of illustration, according to an implementation. In the illustrated implementation, the antenna embedded inventory shelf 1100 includes a ground plane 1112, a substrate 1114, antenna elements 1102 and a protective cover 1116. The ground plane 1112 may be formed of any conductive material that can provide a common ground for the antenna embedded inventory shelf 1100. The ground plane may be formed of any conductive material, such as metal, and may be of any thickness.

In one implementation, the ground plane 1112 is shelf of a standard gondola shelf system. A gondola shelf system typically includes a flat base and a vertical component featuring notches, pegboards, or slatwalls. The vertical pieces are fitted with shelves, such as metal shelves, to support inventory items. Gondolas placed end-to-end can form rows of shelving. For example, an existing gondola shelf system located in a materials handling facility can be converted into an antenna embedded inventory shelf 1100 by utilizing the existing gondola shelf as the ground plane 1112 of the antenna embedded inventory shelf 1100.

Adjacent to the ground plane 1112 is a substrate 1114 formed from a material having a low dielectric constant with respect to other materials. The substrate 1114 may be coupled to the ground plane (permanently or temporarily), removably placed on the ground plane, etc. For example, if the ground plane is a metal shelf, the substrate 1114 may be placed on the shelf. The substrate 1114 may be formed of any low dielectric constant material, such as, but not limited to, acrylonitrile butadiene styrene ("ABS"), polystyrene, polyvinyl chloride ("PVC"), high-density polyethylene ("HDPE"), low-density polyethylene ("LDPE"), etc. The substrate is configured to improve the field above the antenna embedded inventory shelf 1100 generated by the antenna elements 1102 and to prevent or reduce field below the antenna embedded inventory shelf 1100. The substrate 1114 is of a sufficient thickness to provide support to the antenna embedded inventory shelf 1100 and improve the field above the antenna embedded inventory shelf 1100. Generally, the substrate 1114 may be at least approximately one-quarter of an inch thick. In one implementation, the substrate is approximately three-eighths of an inch thick.

Each of the antenna elements 1102 are embedded into the top of the substrate 1114, placed onto the top of the substrate 1114, and/or affixed to the top of the substrate 1114. For example, the antenna elements may be provided in fabricated sheets 1103 with an adhesive back that are affixed to the top of the substrate 1114. In other implementations, the antenna elements may be incorporated into printed circuits, provided as adhesive copper tape, etc., that are affixed to the top of the substrate 1114. In still other implementations, the substrate 1114 may be cut or etched and the antenna elements 1102 incorporated into the top of the substrate 1114. In the example illustrated in FIGS. 11A-C, the antenna elements 1102 are incorporated into fabricated sheets 1103 that are affixed to the top of the substrate 1114.

Finally, a protective cover 1116 is affixed over the top of the antenna elements 1102 and/or substrate 1114 to provide a protective surface between the antenna elements 1102 and inventory items that are placed onto the inventory shelf. The protective cover 1116 may be formed of any material. In some implementations, the protective cover 1116 is formed of the same material as the substrate 1114. For example, the protective cover may be ABS, polystyrene, PVC, HDPE, LDPE, etc. The protective cover 1116 may be any thickness sufficient to protect the antenna elements 1102. For example, in some implementations, the protective cover 1116 is approximately one-sixteenth of an inch thick.

In some implementations, the protective cover 1116 may be formed of a porous plastic that is approximately 50% plastic and 50% air to provide a separation between the antenna elements 1102 and the inventory items 1106. For example, the protective cover 1116 may be approximately one-quarter of an inch thick. Separating the antenna elements 1102 and the inventory items 1106 using a porous plastic protective cover 1116 reduces detuning caused by the inventory items. While this example describes the use of a porous plastic, in other implementations, other materials may likewise be utilized.

Figure 11C:
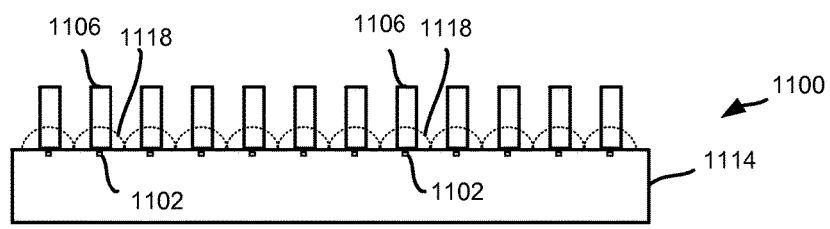

FIG. 11C is a side view of an antenna embedded inventory shelf 1100, according to an implementation. As illustrated, when an antenna element 1102 is excited, it generates a field 1118, such as a magnet field or an electric field. For example, the antenna element 1102 may generate a magnetic field for use in reading RFID tags. By positioning the antenna elements 1102 along the shelf, inventory items 1106 may be placed in rows on the shelf and the RFID tags attached to the inventory items 1106 will be located in at least one field generated by the antenna elements 1102 so that the RFID tag can be read and the item identified.

Utilization of the substrate 1114 promotes the field 1118 generated by the antenna elements 1102 in a direction above the antenna embedded inventory shelf 1100 and hinders propagation of the field below the antenna embedded inventory shelf 1100, thereby reducing or prohibiting the reading of RFID tags located below the antenna embedded inventory shelf 1100.

The fields 1118 generated by the antenna elements 1102 may have a footprint between approximately one inch and approximately six inches. Likewise, the antennas may be positioned or tuned so that the fields 1118 generated by the antenna elements 1102 overlap, to prevent locations on the antenna embedded inventory shelf 1100 where an RFID tag is not readable by at least one antenna element 1102.

While FIGS. 11A-C illustrate one possible implementation of an RFID reader and tag system usable herein, it is to be appreciated that any other type of RFID reader may be employed.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A radio-frequency identification (RFID) tag comprising:
    a substrate;
    an antenna, coupled to the substrate and formed at least in part from a susceptive material comprising a layer of metal coupled to a layer of polyethylene-terephthalate (PET), the layer of PET configured to expand when absorbing electromagnetic energy and the layer of metal configured to fracture when absorbing the electromagnetic energy, the antenna having a receiver to receive an interrogating signal from an RFID reader and a transmitter to transmit a response to the interrogating signal to the RFID reader, the response identifying the RFID tag, wherein the layer of metal includes at least one notch disposed substantially orthogonally to a length of the layer of metal, the at least one notch to assist in the fracture of the layer of metal when the layer of PET expands due the absorbing of the electromagnetic energy, wherein the receiver is able to continue to receive signals from the RFID reader and the transmitter is able to continue to send responses to the RFID reader when the layer of metal is fractured; and
    an integrated circuit (IC) coupled to the antenna, the IC to receive power from the interrogating signal via the antenna to power the RFID tag, demodulate the interrogating signal from the RFID reader, and modulate the response for transmission to the RFID reader.

2. A radio-frequency identification (RFID) tag, comprising:
    a substrate;
    an antenna coupled to the substrate and comprising a receiver to receive a signal from an RFID reader and a transmitter to transmit a response to the signal to the RFID reader;
    an integrated circuit (IC) coupled to the antenna, the IC to:
        receive the signal from the antenna;
        demodulate the signal; and
        modulate the response to the signal for transmission to the RFID reader by the antenna; and
    a thermoplastic layer adjacent to at least a portion of the antenna, the thermoplastic layer to expand due to heat absorption and stress and fracture the antenna based at least in part on the expanding due to the heat absorption;
    and wherein the antenna further comprises a metal layer and at least one notch disposed substantially orthogonally to a length of the antenna, the at least one notch to assist in the fracture of the antenna when the antenna is stressed due to heat expansion of the thermoplastic layer, the receiver being able to continue to receive signals from the RFID reader and the transmitter being able to continue to send responses to the RFID reader when the layer of metal is fractured.

3. An RFID tag as recited in claim 2, wherein the thermoplastic layer comprises a first thermoplastic layer that couples to at least a bottom side of the antenna disposed towards the substrate, and further comprising a second thermoplastic layer coupled to a top side of the antenna disposed away from the substrate.

4. An RFID tag as recited in claim 2, wherein the RFID tag is integrated with a container of a microwavable food item.

5. An RFID tag as recited in claim 1, wherein the RFID tag is integrated with a container of a microwavable food item.

6. An RFID tag as recited in claim 1, wherein the antenna further comprises one or more serrations along the length of the layer of metal to assist in the fracture of the antenna when the antenna is stressed due to heat expansion of the thermoplastic layer.

7. An RFID tag as recited in claim 1, wherein the antenna further has a varying thickness along the length of the layer of metal to assist in the fracture of the antenna when the antenna is stressed due to heat expansion of the thermoplastic layer.

8. An RFID tag as recited in claim 2, wherein the thermoplastic layer comprises a layer of polyethylene-terephthalate (PET).

9. An RFID tag as recited in claim 2, wherein the antenna further comprises one or more serrations along the length of the layer of metal to assist in the fracture of the antenna when the antenna is stressed due to heat expansion of the thermoplastic layer.

10. An RFID tag as recited in claim 2, wherein the antenna further has a varying thickness along the length of the layer of metal to assist in the fracture of the antenna when the antenna is stressed due to heat expansion of the thermoplastic layer.

* * * * *